United States Patent [19]
Murphree

[11] 3,835,234
[45] Sept. 10, 1974

[54] SONAR ECHO SIMULATOR

[75] Inventor: Francis J. Murphree, Panama City, Fla.

[73] Assignee: The United States of America as represented by the Secretary of the Navy, Washington, D.C.

[22] Filed: Aug. 9, 1973

[21] Appl. No.: 386,918

[52] U.S. Cl. .................................. 35/10.4
[51] Int. Cl. ............................. G09b 9/06
[58] Field of Search ....................... 35/10.4

[56] References Cited
UNITED STATES PATENTS

| | | | |
|---|---|---|---|
| 3,610,798 | 10/1971 | Murphree | 35/10.4 |
| 3,671,657 | 6/1972 | Murphree | 35/10.4 |
| 3,700,780 | 10/1972 | Roeschlein | 35/10.4 |

Primary Examiner—Malcolm F. Hubler
Attorney, Agent, or Firm—R. S. Sciascia; J. W. Pease

[57] ABSTRACT

An electrical system for generating simulated sonar echoes wherein each simulated echo is the composite of a number of spaced, possibly overlapping echoes from the target highlights, and wherein the amplitude and the spacing of the individual echoes is a function of the target nature and target aspect relative to the illuminating sonar. The system employs a digitized signal storage and readout circuit to time sample the input sonar signal and provide output signals through a multiplying digital to analog (D/A) converter, and a plurality of read only memories (ROM's). Each ROM is different in that each ROM has target data stored at different addresses therein and also the data stored in each ROM is different in accordance with the potential aspect angle of the target. Also each ROM has the data for the same highlight stored at the same address, but the amplitude of a particular highlight is a variable quantity, including zero, depending upon the azimuth sector over which the ROM is used. The ROM's are employed in conjunction with a highlight generator, counter means and an aspect angle responsive selector circuit to provide, via ROM address and ROM selection, suitable data to the multiplying D/A converter to provide the simulated echo desired.

4 Claims, 3 Drawing Figures 3,835,234

SONAR ECHO SIMULATOR

CROSS REFERENCE TO RELATED APPLICATIONS

Reference material relating to the subject application includes U.S. Pat. No. 3,610,798 in which is disclosed an echo highlight generator; copending application Ser. No. 383,013, filed July 26, 1973, disclosing a digitized signal storage and readout system; and U.S. Pat. No. 3,609,671, which describes a target echo synthesizer.

BACKGROUND OF THE INVENTION

This invention relates to that portion of the field of electronic simulation devices in which there is required for training or test purposes the generation of submarine sonar signatures representative of selected types of submarines, and range and aspect of the selected type submarine.

In the past, the active sonar echo of a pseudo submarine has been simulated by tape recorder techniques. This prior art technique involves amplifying and elongating the original sonar signal by a direct recording and time delayed playback of the signal. The length of the returning echo is controlled in steps to simulate the target echo originating from the bow, beam, or stern quarter. A basic disadvantage of this approach lies in the complexity and instability of tape recorders as related to desired accuracy of signal.

A pulsed sinusoid also is frequently used to simulate a sonar echo. This method is economical but lacks realism since the echo resembles, at all times, that from a beam aspect target.

Another form of echo simulation involves the use of general purpose digital computer means. In principal this method can be used to simulate any phenomena reducible to a mathematical model. The relative disadvantage of the digital computer/math model approach is relatively high cost, complexity and the fact that the computer must be programmed.

New techniques have recently been proposed for synthesizing echoes from submarine-like targets, as well as for simulating reverberation. For example, U.S. Pat. No. 3,610,798, titled SONAR ECHO SIMULATION, describes a method for generating highlight pulses that may be used to trigger either a function generator or a memory readout to generate synthetic echoes $2S/C/\cos\theta + \tau$ seconds long, where $S$ is the simulated target length, $C$ is the velocity of sound in water, $\theta$ is the angle between the target axis and the illuminating sound rays, and $\tau$ is the illuminating pulse length. The composite echo is a summation of as many individual echoes, each an approximate replica of the illuminating pulse, except for amplitude, as there are highlight trigger pulses.

U.S. Pat. No. 3,609,671, titled ACTIVE SUBMARINE ECHO SYNTHESIZER, describes another echo simulation technique having an arrangement whereby a quantity proportional to $\cos\theta$ is converted to a digital number which addresses a memory location at which a sequence of numbers is stored. Each number of the sequence defines one point on the envelope of the simulated echo.

SUMMARY OF THE INVENTION

This invention consists of a method for synthesizing submarine and similar echoes, improved over earlier methods in that a very large number of target reflector points can be simulated and in that the strength of each of these points can be made a function of aspect and/or the nature of the target. The basic technique is to sample and store the illuminating signal and then to read it in an interleaved manner, each separate readout beginning at a time when echoes from particular reflectors of the simulated target would reach an observer. Each individual reflector echo is assigned a strength according to the target type and aspect by employing a separate ROM or equivalent for differing aspect sectors, for a given target, in which is stored as many numbers as there are reflector points. The magnitude of a particular number determines the strength of the echo from the corresponding reflector rather than the amplitude of one point on the envelope of the composite echo as is the case for U.S. Pat. No. 3,609,671. The simulated target echo for the present invention is a summation of all the individual highlight echoes.

DESCRIPTION OF THE DRAWINGS

Other objects, advantages and novel features of the invention will become apparent from the following detailed description of a preferred embodiment of the invention when considered in conjunction with the accompanying sheets of drawings wherein.

DESCRIPTION OF THE PREFERRED EMBODIMENT

Figure 1:
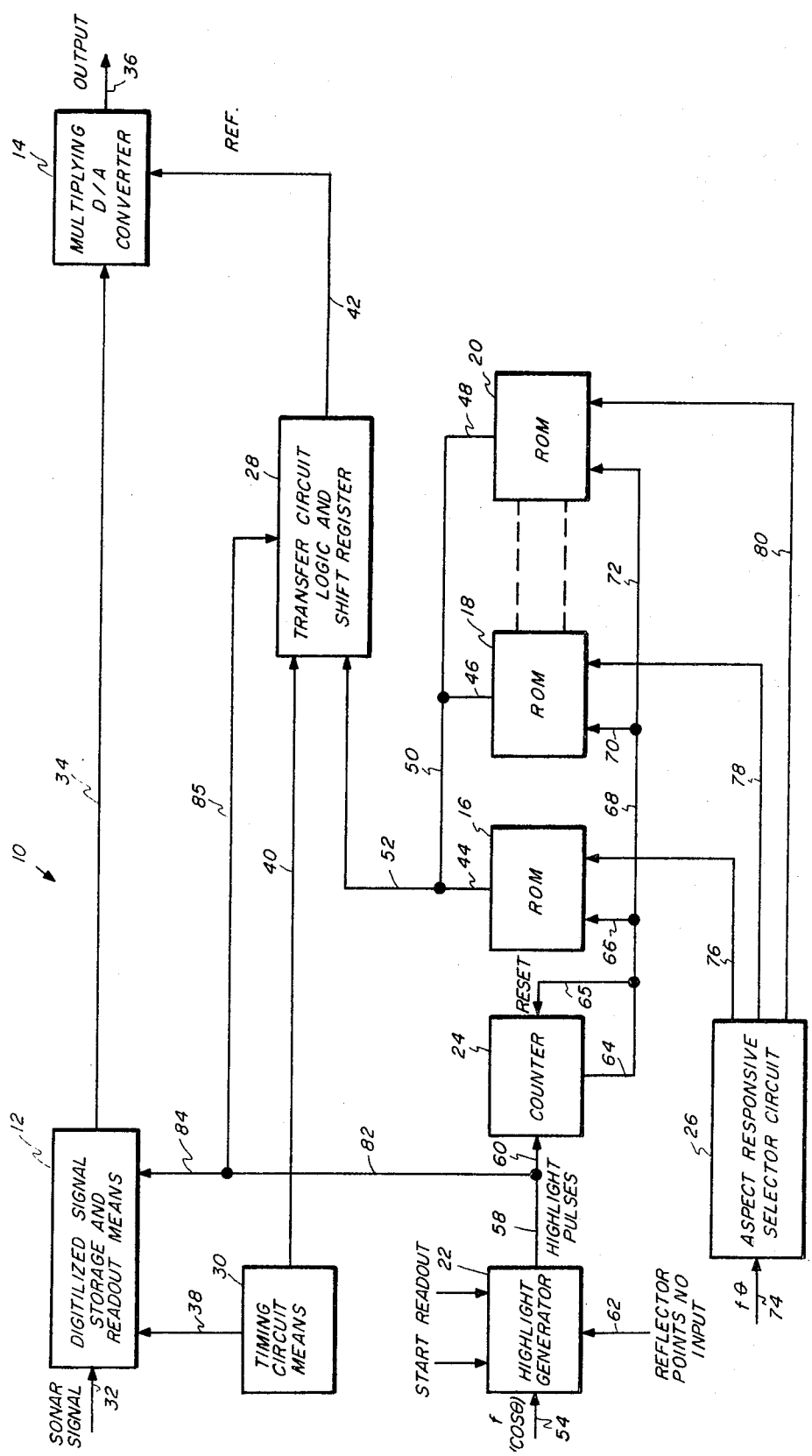
FIG. 1 is a diagrammatic illustration in block form of echo simulating apparatus, i.e., simulator, embodying the present invention.

The echo simulator 10 illustrated in the drawings and described hereinafter as an exemplary embodiment of the invention comprises, as shown in FIG. 1, digitized signal storage and readout means 12 and a multiplying digital to analog (D/A) converter means 14, a plurality of read only memories (ROM's) 16, 18 to 20 addressed via a highlight generator 22 and counter 24 and selectively activated via an aspect responsive selector circuit 26, and transfer circuit logic and shift register means 28 through which the output of the ROM's is passed to the D/A converter 14 to modify the signals received from means 12. Timing circuit means 30 is provided for time coordination of the electrical pulses passed through the signal storage and readout means 12 and the electrical pulses passed through the transfer circuit 20.

Referring to FIG. 1 in detail, the illuminating sonar signal is passed on a line 32 to storage and readout means 12 and hence on a line 34 to the D/A converter 14 from which its output is provided on a line 36. Means 30 is connected to circuit 12 and to circuit 28 by respective flow lines 38 and 40 to time coordinate the operations of circuits 12 and 28 as will be described hereinafter. Transfer circuit 28 is connected by line 42 to D/A converter 14 to provide a reference signal modifying the original pulse signal in length of pulse, and number and magnitude of amplification variations therein dependent upon the nature of the target and the aspect of the target with respect to the illuminating sonar (not shown).

Data stored in a plurality of ROM's exemplified by 16, 18 and 20 is read out on lines 44, 46, 48, 50 and 52 to the transfer circuit 28 to control via a reference signal on line 42 the amplitude of the highlights of a simulated echo. Each of the ROM's has a plurality of addresses. At each address is stored highlight data representative of a selected target for a given aspect angle. Each ROM is different in stored data to represent a variety of target aspect angles. Thus, to read out of the ROM's data corresponding to the nature of a particular target at a particular aspect angle, one must provide means for addressing each ROM for proper address and also enabling only that ROM corresponding to a selected aspect angle.

The highlight generator 22 and counter 24 provide the means for properly addressing the ROM's 16, 18 and 20. Highlight generator 22 receives via line 54 an input which is a function of cosine $\theta$ where $\theta$ is the target aspect angle, i.e., the angle between a reference axis of the target (not shown) and a line to the illuminating sonar. Highlight generator 22 is connected to counter 24 via lines 58 and 60 and produces a series of trigger pulses whose separation is proportional to cos $\theta$ and the total number of pulses produced. The latter is a design parameter which can vary from 10 to 100 or more, depending upon the number of reflector points one wishes to assign to the simulated target. The time separation between the first and last highlight pulse is approximately equal to $2S/C/\cos\theta/ + t_1$ secs where $S$ is the target length, $C$ the velocity of sound in water, and $t_1$ is a design constant introduced so that $2S/C/\cos\theta/ + t_1$ is always greater than zero. Input line 62 represents a second input to highlight generator 22 for adjusting the number of reflector points desired in the simulated target.

Counter 24 is connected via lines 64, 66, 68, 70 and 72 to the address inputs of ROM's 16, 18 and 20 such that the count in counter 24 selects a particular address in each ROM corresponding to that counter count. Each address corresponds to a different amplitude for each highlight pulse. Thus, at the end of the first highlight pulse a number will appear at the output of the turned on ROM proportional to the amplitude desired for the first highlight. At the end of the second pulse a number will appear proportional to the amplitude desired of the second pulse, and so on. Suitable means, exemplified by line 65, are provided for resetting the counter 24.

Since each ROM has different data therein corresponding to different target aspect angles, means are required to activate, i.e., turn on, that ROM which has data for the particular aspect angle being read. This means is provided in the aspect responsive selector circuit 26 which receives an input corresponding to the target aspect angle within the limits of zero to 360°. This input is received via line 74 as indicated and is thus a function of $\theta$. The outputs of selector circuit 26 are passed on lines 76, 78 and 80 to the respective ROM's 16, 18 and 20.

Highlight pulses from generator 22 are also passed on lines 82 and 84 to storage and readout means 12 and on lines 82 and 85 to transfer circuit 28. The purpose of these connections is to activate shift registers in the circuits 12 and 28 as will be hereinafter described.

Figure 3:
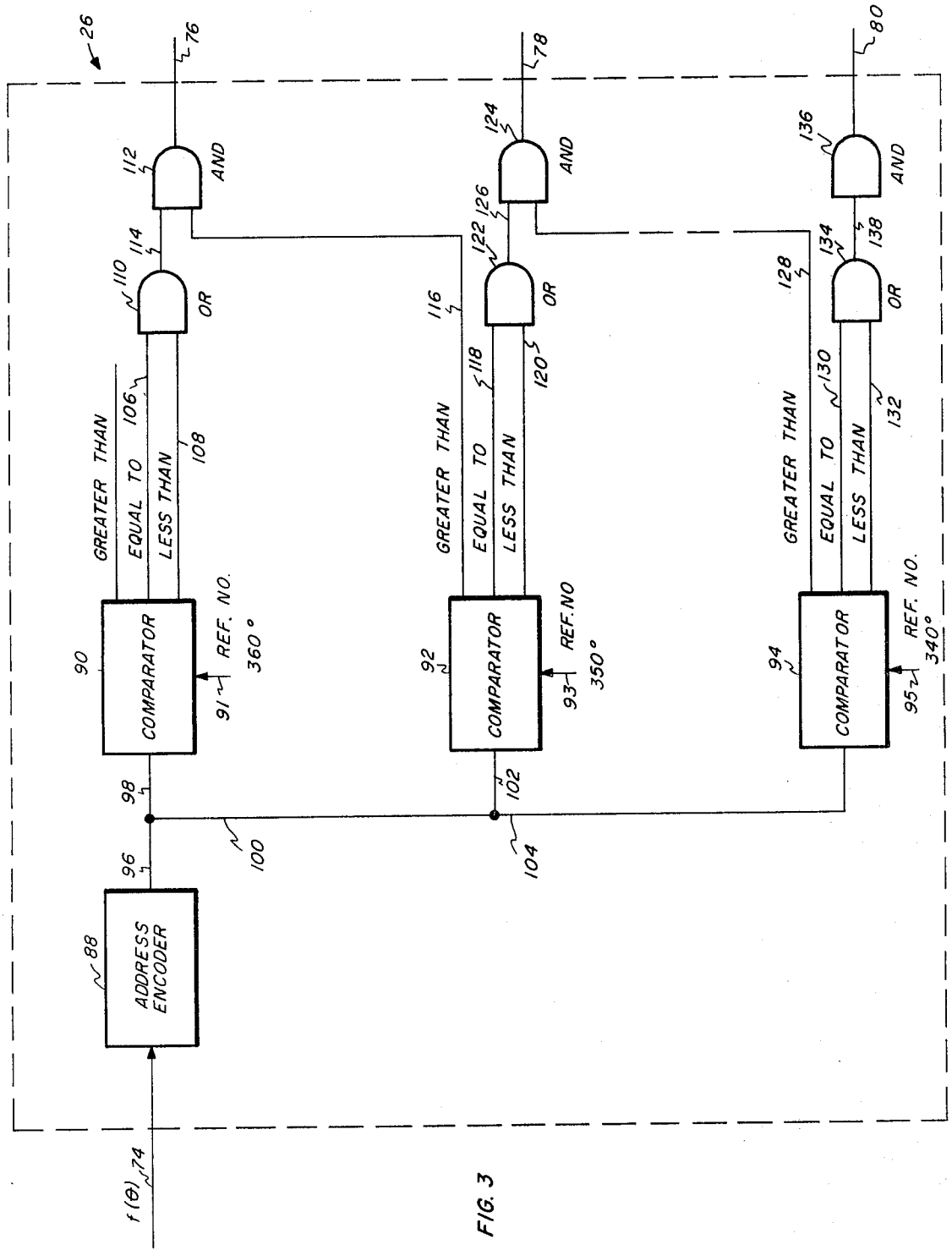
FIG. 3 is another more detailed diagrammatic illustration in block form of an abstract angle responsive selector circuit which is a portion of the apparatus of FIG. 1.

Referring now to FIG. 3, in this preferred form of the invention, the aspect responsive selector circuit 26 comprises an address encoder (aspect encoder) 88 which provides, responsive to the $f(\theta)$ input, a common digital output to a plurality of comparators indicated at 90, 92 and 94 via lines 96, 98, 100, 102 and 104. Also applied to the comparators as inputs are sequential or graduated reference numbers in digital form and indicated by arrows 91, 93, and 95 for comparison to the common digital input from address generator 88. These digital reference numbers represent a sequence of numbers such as 360°, 350°, 340°, etc. In comparing the two input signals, i.e., the reference number signal to the address generators signal, in each comparator, output signals of "greater than," "equal to" or "less than" are developed. With respect to each comparator, its "equal to" and "less than" outputs are connected as inputs to an associated OR gate and the output of the OR gate, together with the "greater than" output of the next adjacent comparator, are connected as inputs to an associated AND gate whose output is connected to an associated ROM. Thus, as shown in FIG. 3, the "equal to" and "less than" outputs of comparator 90 are connected by respective lines 106 and 108 to OR gate 110. AND gate 112 is connected by line 114 to receive the output of OR gate 110 and is connected by line 116 to receive a "greater than" signal from comparator 92. The output of AND gate 112 is passed on line 76 for enabling, i.e., turning on, ROM 16 of FIG. 1. Completing the description of FIG 3, comparator 92 is connected by lines 118 and 120 to OR gate 122. AND gate 124 is connected by lines 126 and 128 respectively to OR gate 122 and the "greater than" output of comparator 94. The output of AND gate 124 passes on line 78 to enable ROM 18. In relation to comparator 94, the "equal to" and "less than" outputs, lines 130 and 132, connect to OR gate 134 which connects to AND gate 136 by line 138 and the output of AND gate 136 is passed on line 80 to ROM 20.

Figure 2:
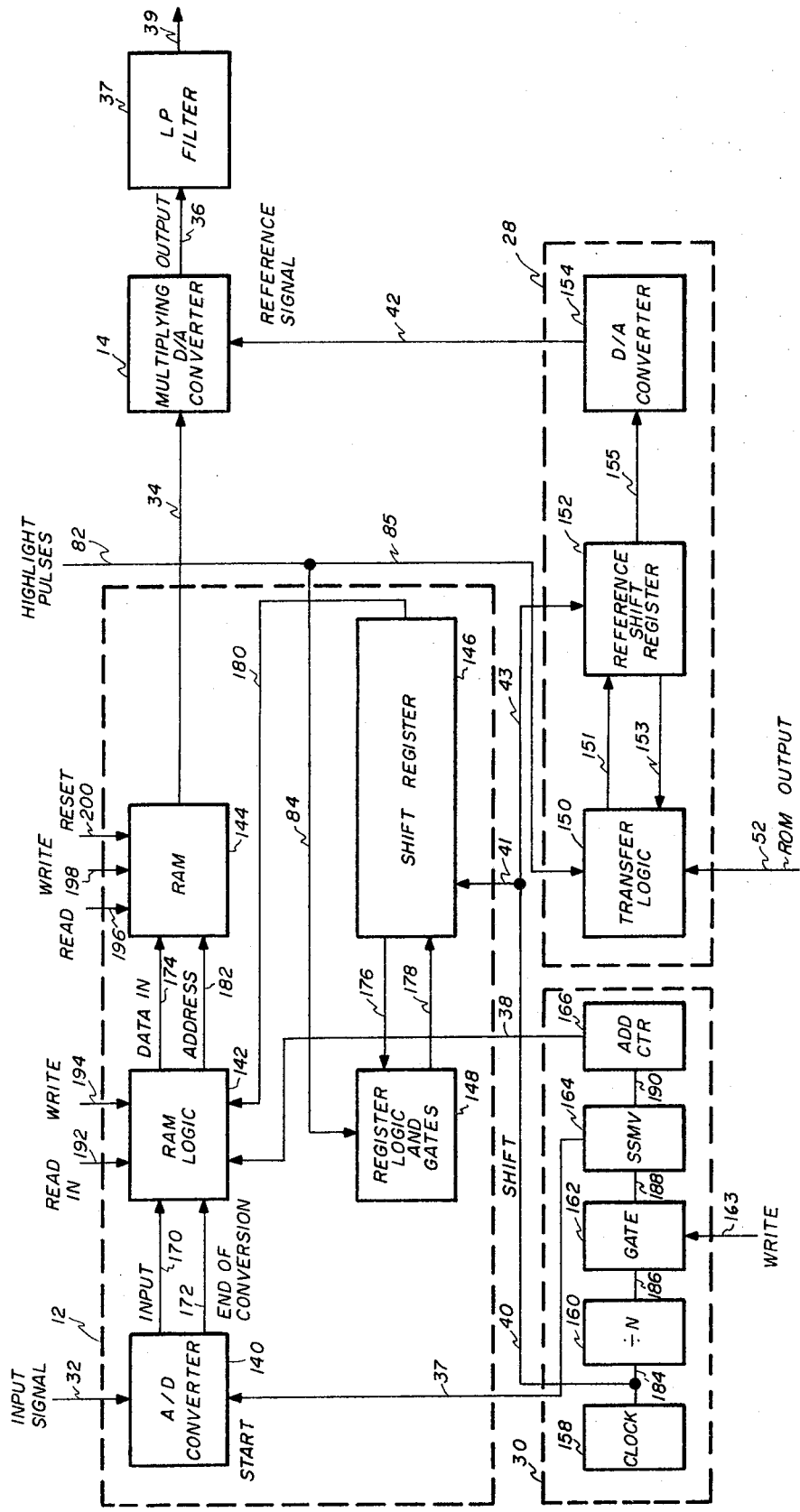
FIG. 2 is a more detailed diagrammatic illustration in block form of a storage and readout means and a transfer circuit, which are portions of the apparatus of FIG. 1.

Referring now to FIG. 2, there is shown details of the digitized signal storage and readout means 12, of the transfer logic and shift register circuit 28, and the timing circuit means 30. The storage and readout means comprises basically an A/D (analog to digital) converter 140, a RAM (random access memory) logic 142, a RAM unit 144, a recirculating shift register means 146, and its associated logic and gate means 148. The transfer logic and shift register circuit 28 comprises a transfer logic 150, reference recirculating shift register 152, and D/A converter 154. Reference shift register 152 is connected to transfer logic 150 by flow lines 151 and 153, and to the D/A converter 154 by flow line 155. One suitable timing circuit means comprises, as shown in FIG. 2, a clock 158, divide by N circuit 160, gate means 162, an SSMV (single shot multivibrator) means 164, and an address counter 166. Gate means 162 is provided with a "write" input 163. N is also the number of stages in shift registers 146 and 152.

The input sonar signal is passed on input line 32 to the A/D converter 140 and thence via an input line 170 and end of conversion line 172 to the RAM logic 142 from which data is fed into and stored in the RAM 144 via data in line 174. The RAM 144 when read out passes its data via line 34 to the multiplying D/A converter 14 whose output is passed on line 36. A low pass filter means 37 having an output line 39 is provided to smooth out the output signal. The shift register 146 is connected to its associated register logic and gates 148 via flow lines 176 and 178. Highlight pulses are passed via lines 82 and 84 to the logic and gates 148, and the output of the shift register 146 is passed on its output line 180 to the RAM logic 142. The address counter 166 is connected via line 38 to the RAM logic 142 and address data from RAM logic 142 is passed to RAM 144 via an address data input line 182. The two recirculating shift registers 146 and 152 are simultaneously shifted via lines 40, 41, and 43. The several elements of the timing circuit 30 are connected by flow lines 184, 186, 188 and 190 as shown. The sample rate is determined by the clock 158 and the divide by N circuit 160, one sample taking place (and being converted into a binary number) for every pulse from the SSMV 164 via start sample line 37. When a highlight pulse, the third in a sequence of 30, for example, is applied to the signal storage and readout means 12, FIG. 1, it causes the number in address three of the active ROM to be transferred via transfer logic 150, FIG. 2, to reference shift register 152. At the same time this pulse starts a readout of RAM 144 via logic 148 and shift register 146. Timing, via timing circuit 30, is such that when the number in the first address of RAM 144 reaches D/A converter 14 on line 34, the number from address three of the ROM appears at the input of D/A converter 154 and thence via line 42 as a pulse on the reference input to D/A converter 14. When the second sample from RAM 144 reaches D/A converter 14 the ROM address three number is again applied to D/A converter 14, and so on. The foregoing is because the recirculation time of shift register 152 is the same as the interval between consecutive data samples read out of RAM 144. This process continues until this particular readout sequence of RAM 144 is complete. The reference signal on line 42 derived from the particular ROM in use modifies the original signal to account for target nature and aspect angle of the target. Read and write input lines 192 and 194 are provided for the RAM logic 142, and read, write and reset inputs 196, 198 and 200 are provided for the RAM 144. D/A converter 154 includes a built-in reference input.

Considering the operation of the subject sonar echo simulator and referring to FIG. 2 in conjunction with FIG. 1, an electrical analog of the illuminating sonar signal is applied via line 32 and A/D converter 140 to the signal storage RAM 144, successive samples being directed to sequential addresses by RAM logic 142 after receipt of a read-in signal. Some time after "read-in" begins application of a "write," i.e., read out signal, to RAM logic 142 and to highlight generator 22 starts readout of the data placed in RAM 144 which is a new and possibly overlapping sequence beginning with each highlight pulse.

Each digital number readout of the RAM 144, corresponding to an amplitude sample of the input signal, is applied via line 34 to the multiplying D/A converter 14. However, there is also a reference signal input to the D/A converter 14 via line 42 from the shift register 152 of the transfer circuit 28 via the D/A converter 154. This reference signal provides amplitude variation for the various echo highlights to properly characterize the nature and aspect angle of a particular target.

The data for the reference signals is stored in the plurality of ROM's 16, 18 and 20, the data being read out of the ROM's by address in each, via the highlight generator 22, and by the enabling of a specific ROM corresponding to a specific target aspect angle, via the selector circuit 26 (see FIG. 3), including the address encoder 88, comparators 90, 92 and 94 and the OR and AND gate logic previously described herein.

It is to be understood that the ROM's have the same number of addresses, the number being equal to or greater than the number of echo highlights. The addresses of the separate ROM's are numbered the same, i.e., 1 to 30 for example. This is necessary because the same number of echo highlights is generated by the echo highlight generator 22 for different aspect angles. Counter 24, FIG. 1, is designed to reset at the last highlight (a number known in advance), leaving it in a condition to start a new readout. While the address numbers of the separate ROM's are the same and each address represents the same highlight, the highlight amplitude number stored in these addresses are respectively a function of the azimuth sector the particular ROM represents and may have any value within design limits, including zero. Thus, each ROM has the data for the same highlight stored at the same address, but the amplitude of a particular highlight is a variable quantity, including zero, depending upon the azimuth sector over which the ROM is used.

System operation is synchronized so that each time a data sample corresponding to a readout sequence having started at a particular time is applied to the D/A converter 14, a reference level established at the initiation of the readout is applied by D/A converter 154 to D/A converter 14 via reference signal input line 42. Synchronization is established by simultaneous shift of the recirculating shift registers 146 and 152 via clock 158 and shift signal lines 40, 41 and 43.

The read, write and reset inputs to the various elements described in the subject drawings can be supplied from associated equipment. One suitable source is a general purpose computer, of which the Honeywell model ICM—40 is an example.

Considering greater detail in operation of the shift registers 146 and 152, the first echo highlight pulse of a sequence is converted to a logical one in register and logic gates 148 and applied to register 146 where it is shifted to the end and applied through logic 142 to read address one of RAM 144. The RAM 144 reads out a number corresponding to the amplitude of the first signal sample which is applied to D/A converter 14. The decoded amplitude of this sample is controlled by the magnitude of the reference input, which is derived, via shift register 152 and associated circuitry, from one of the highlight ROM's as will be described hereinafter.

The logical one is recirculated back through shift register 146 with a one added to it so that the next output is a logical two which is applied to the read address of RAM 144. The logical two is recirculated as a logical three, etc., until the contents of the RAM 144 are completely read out. During this readout sequence the same reference signal is applied to D/A converter 14, so what ultimately appears out of the system is a replica of the original sonar signal with an amplitude proportional to the data stored at one selected address of one selected ROM. If during the first readout a second echo highlight occurs, a second readout begins; in general several RAM readouts can overlap since the time required to read a single address can be made very small compared to the original signal sampling rate. For example, if the sampling rate is 1,000 per second, the time required for the RAM to deliver an output and recover ready for the next number is less than 1 microsecond; the number of shift register stages is 100 and the shift rate is 100,000 per second, readouts delayed with respect to each other 10 microseconds would be possible.

Considering operation of the reference shift register 152, the first echo highlight command causes the transfer of the number in address one of the particular ROM in use to the input of shift register 152, where it shifted to its end and ultimately appears via D/A converter 154 as the reference input to D/A converter 14 at the same instant as the first signal sample. This ROM number is recirculated in shift register 152 so that it appears as a reference in D/A converter 14 each time successive signal samples appear. A second echo highlight command would cause the number at address two of the same ROM to be applied to shift register 152, so that each time a corresponding signal sample appeared at D/A converter 14, the reference input would correspond to the amplitude at location two. This condition would exist for each highlight.

A detailed discussion of circuitry required to accomplish this operation can be found in copending application, Ser. No. 383,013 filed July 26, 1973.

Echoes from icebergs, schools of fish, sea mounts, etc., will not ordinarily behave as a function of aspect as do those from a long, narrow target. To synthesize echoes from these other targets, the highlight generator can be modified so that the separation between pulses is independent of aspect, but the choice of ROM's is still aspect dependent as described herein.

What is claimed is:

1. A sonar echo simulator comprising:
   a. a digitized signal storage memory means, first shift register means, and first logic and gating means for transferring original sonar input signals to digital form, sampling the same and storing each sample at a different address in said memory means for individual replica readouts,
   b. highlight generator means for developing a series of highlight pulses representative of the target nature by way of target reflector points, and a counter means for providing a digital output corresponding to the number of highlight pulses,
   c. a plurality of read only memory units each having an address at which is stored data corresponding to amplitude of signal and said units each having different data therein corresponding to different aspect angles of the target, and wherein each unit has the data for the same highlight stored at the same address, but wherein the amplitude of a particular highlight is a variable quantity, including zero, depending upon the azimuth sector over which the unit is used,
   d. an address generator, comparator, and logic gating means for selectively activating said memory units corresponding to target aspect angle input signal data to said address generator, and
   e. second logic and second shift register means and means time coordinating the latter with said first logic and shift register means to modify each of said replica readouts to incorporate target nature and aspect angle information as derived from said read only memory units, such that each individual reflector echo is assigned a strength according to nature and aspect angle.

2. A sonar echo simulator comprising:
   a. a digitized signal converting storage and readout means including an analog to digital converter, a random access memory, a first recirculating shift register, and logic and gate means for receiving an original transmitted input signal pulse representative of a sonar ping and passing as an output an original digital replica thereof,
   b. a multiplying digital to analog output converter connected to receive said digital replica output from said storage and readout means and provide an analog output signal,
   c. 2S/C/Cos $\theta$/ and highlight generator means responsive to a starting pulse and an input which is a function of aspect angle $\theta$ to provide a plurality of output highlight pulses each representative of the time of occurrence of a highlight echo of target reflection points,
   d. a plurality of read only memory units each storing at a different address digital number information representative of individual reflector echoes assigned a strength according to the target type and each memory unit incorporating different preselected digital data representative of differing aspect sectors of a given target, each unit having the data for the same echo stored at the same address but the units depending upon the azimuth sector to which the unit is applied,
   e. counter means connected to said highlight generator and said memory units for converting a series of highlight pulses to digital number data to selectively address said read only memories in location corresponding to a particular highlight pulse sample and hence nature of target,
   f. a gating aspect angle responsive selector circuit means for receiving a signal representative of target aspect angle, comparing said output angle signal with a set of reference signals selected to represent different aspect angles, and passing a gated output to enable a selected of said readout memory units corresponding to input target aspect data to provide an output reference signal in amplitude modulation and length corresponding to highlight pulse and aspect angle, and
   g. transfer circuit logic, a second shift register means and timing means connected to coordinate said shift registers and to apply said reference signal to said multiplying converter to provide simulated sonar echoes representative of selected targets and aspects thereof.

3. Apparatus according to claim 2 in which said selector circuit means includes:
   a. an aspect encoder address generator to provide a common digital signal output corresponding to target aspect angle as represented by input data to said generator,
   b. comparator means connected to receive said aspect angle digital signal and a plurality of progressive digital number inputs thereto, and
   c. comparator logic means connected to said comparator means and to said read only memory units to activate a specific of said memory units dependent upon aspect angle data applied to said address generator aspect encoder.

4. Apparatus according to claim 2 in which said selector circuit means includes:
   a. an aspect encoder address generator connected to receive an input signal which is a function of target aspect angle and provide a digital number aspect angle output signal corresponding thereto, b. a plurality of comparator units each connected to receive as one common input said digital aspect angle output signal and in addition a second digital reference signal input of different value for each comparator unit, said comparator units each having three output lines for indicating respectively that the common input signal in relation to the reference signal thereto is greater than, equal to, or less than, c. comparator logic means including for each comparator unit an OR gate connected to receive inputs from said equal to or less than live signal outputs of its associated comparator unit and an AND gate receiving as one input the output of said OR gate and as a second input the greater than output line signal from the next comparator unit having the next larger reference input signal value, each of said AND gates being connected to activate a selected of said read only memory units having data stored therein suitable to the aspect angle data applied to said address generator.

* * * * *